(12) United States Patent
Kusunoki

(10) Patent No.: US 6,201,455 B1
(45) Date of Patent: Mar. 13, 2001

(54) ANTENNA SWITCH CIRCUIT

(75) Inventor: Shigeo Kusunoki, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/247,911

(22) Filed: Feb. 11, 1999

(30) Foreign Application Priority Data

Feb. 20, 1998 (JP) ................................. 10-038754

(51) Int. Cl.$^7$ ................................. H01P 1/10; H03L 5/00
(52) U.S. Cl. ........................... 333/103; 333/262; 327/308
(58) Field of Search ................................. 333/262, 103, 333/81 A; 327/308

(56) References Cited

U.S. PATENT DOCUMENTS 5,767,721 * 6/1998 Crampton ............................. 327/308

* cited by examiner

Primary Examiner—Robert Pascal
Assistant Examiner—Kimberly E Glenn
(74) Attorney, Agent, or Firm—Jay H. Maioli

(57) ABSTRACT

An antenna switch circuit which suppresses production of a cross modulation distortion includes an input terminal and an output terminal, a field effect transistor connected at a first one of a source electrode and a drain electrode thereof to the input terminal and connected at a second one of the source electrode and the drain electrode to the output terminal, a first controlling power supply to which the drain electrode and the source electrode of the field effect transistor are connected through first and second biasing elements, respectively, a second controlling power supply to which a gate electrode of the field effect transistor is connected through a third biasing element, and a phase shifting element and a feedback resistor connected in series between the second electrode and the gate electrode of the field effect transistor. The field effect transistor is controlled between on and off by varying a voltage of at least one of the first and second controlling power supplies.

4 Claims, 5 Drawing Sheets

FIG. 6

$$y = H1 \cdot x^2 + H2 \cdot x + H3 \cdot x^3 + \ldots \quad (1)$$

$$x(t) = \frac{V}{2}[e^{j\omega 1 \cdot r} + \frac{b1}{2}\{e^{j(\omega 1+\omega m)t} + e^{j(\omega 1-\omega m)t}\} + e^{j\omega 2 \cdot t} + CC] \quad (2)$$

$$y(t) = V \cdot |H1|\cos(\omega 2 \cdot t + \theta 1) + \frac{3}{2}|H3| \cdot b1 \cdot V^3 \cos(\omega 2 \cdot t + \theta 2)\cos(\omega m \cdot t)$$

$$= V \cdot |H1|\sqrt{\{1 + 2B \cdot \cos(\omega m \cdot t)\cos\phi\}^2 + B^2 \cdot \sin^2(\phi)} \cos(\omega 2 \cdot t + \theta 2 + \zeta) \quad (3)$$

$$\phi = \theta 2 - \theta 1$$

$$\zeta = \tan^{-1}\left\{\frac{B \cdot \cos(\omega m)\sin(\phi)}{1 + B \cdot \cos(\omega m)\cos(\phi)}\right\}$$

$$B = \frac{3}{2}\frac{|H3|}{|H1|} \cdot b1 \cdot V^2$$

$$y(t)_{\phi=90°} = B \cdot \sin(\phi)\cos(\omega 2 \cdot t + \theta 2 + \zeta) \quad (4)$$

ANTENNA SWITCH CIRCUIT

BACKGROUND OF THE INVENTION

This invention relates to an antenna switch circuit, and more particularly to an antenna switch circuit having an improved characteristic in a microwave band.

In a portable telephone system which employs a TDD (Time Division Duplex) system, transmission and reception are performed separately from each other in time by time division processing. However, a portable telephone system which has been recently started in Japan employs a CDMA (Code Division Multiplex Access) system, in which transmission and reception are performed simultaneously.

Therefore, occurrence of cross modulation causes a problem with a telephone terminal of the CDMA system. Such cross modulation is caused by mixture of part of a transmission signal of a terminal with an original reception signal as the transmission signal is received by a reception circuit of the terminal itself, and makes a disturbing component to the reception signal. Occurrence of cross modulation is described below.

Where an antenna switch circuit uses an FET of the junction type which includes, for example, a gallium-arsenic substrate, the FET which is a non-linear element has a transfer function which can be represented as an equation (1) of FIG. 6. It is to be noted that, in the expression (1), y is the output voltage, x the input voltage, and H1, H2, H3, . . . are the coefficients of non-linear terms. The coefficients H1, H2, H3, . . . are called nuclei of a Volterra series and are used where the non-linear element includes a capacitor or the like and the non-linearity of it matters.

Where it is considered that the input voltage x is a sum signal of a continuous wave signal as a reception signal and an amplitude modulated wave signal as a disturbing wave signal, the input voltage x(t) can be represented as an expression (2) of FIG. 6. It is to be noted that, in the expression (2), V is the amplitude, b1 the modulation degree of the AM signal, ω1 the carrier frequency (angular frequency) of the disturbing wave signal, ω2 the carrier frequency (angular frequency) of the reception signal, ωm an amplitude modulation component of the disturbing wave signal, and CC a complex conjugate.

Since the signal voltage x(t) is supplied to the FET which is a non-linear element, by substituting the expression (2) into the expression (1), the output voltage y(t) given by an expression (3) of FIG. 6 is obtained. In the expression (3), θ1 and θ2 are the phases of the nuclei H1 and H2 of the Volterra series.

This represents that, if two signals having conditions given by the expression (2) of FIG. 6 are supplied to a non-linear element represented by the expression (1) of FIG. 6, then such an AM component as given by the expression (3) of FIG. 6 is produced and the amplitude of the original reception signal is influenced by the amplitude modulation component ωm of the disturbing wave signal. The amplitude modulation component ωm of the disturbing wave signal cannot be removed by means of a filter or a like means any more. This is a cross modulation component. Then, the cross modulation component makes a noise signal to the reception signal and causes deterioration of the reception sensitivity.

By the way, where an FET is used to form a switch circuit, such a connection scheme, for example, as shown in FIG. 4 is employed. Referring to FIG. 4, the switch circuit shown includes an FET (Q1) in the form of, for example, an FET of the junction type made of semiconductors of gallium and arsenic. The FET (Q1) is used as a switch. The switch circuit further includes biasing resistors R1 to R4, an input signal voltage source VS, and controlling voltage sources VC1 and VC2. The input signal voltage VS is supplied to the source of the FET (Q1), and an output from the drain of the FET (Q1) is used as an output of the switch circuit. A drain-source resistance RDS of the FET (Q1) depends upon a gate-source voltage VGS and has such a characteristic as, for example, illustrated in FIG. 5. Accordingly, when VGS≧VON, the resistance RDS is almost equal to zero and the FET (Q1) exhibits an on state, but when VGS<VON, the resistance RDS is sufficiently high and the FET (Q1) exhibits an off state.

In the circuit of FIG. 4, since VGS=VC2−VC1, the FET (Q1) can be controlled between on and off by varying both or one of the control voltages VC1 and VC2, for example, by varying the control voltage VC2. When the FET (Q1) is on, the input signal voltage VS is extracted at the output side through the FET (Q1).

However, when the FET (Q1) is on, a position of the voltage VDC(=VC2−VC1) shown in FIG. 5 provides an operating point, and the signal voltage VS exhibits a deflection around the voltage VDC. Then, in the case of FIG. 5, the signal voltage VS exhibits a lower voltage at a portion thereof indicated by slanting lines in FIG. 5 than the voltage VON, and therefore, the signal voltage VS suffers from a distortion at the portion thereof indicated by the slanting lines. Further, if a reception signal and a leak signal of a transmission signal are supplied to the switch circuit as described above, then a cross modulation distortion is produced on the output voltage of the switch circuit due to the non-linearity of the characteristic of FIG. 5 at the portion lower than the voltage VON.

In order to prevent production of such a distortion as described above, the voltage VDC should be set high. In this instance, in order to reduce production of a cross modulation distortion by approximately 20 dB in a portable telephone set of the CDMA type, a voltage of approximately 6 V is required.

However, a portable telephone set is driven by a battery, and the voltage of the battery is designed to be as low as possible such as 3 V or less in order to achieve power-saving. Accordingly, employment of the voltage VDC of approximately 6 V is not preferable in terms of the power consumption, and a solution to this problem is demanded.

SUMMARY OF THE INVENTION

It is an object of the present invention to provide an antenna switch circuit which suppresses production of a cross modulation distortion.

In order to attain the object described above, according to the present invention, there is provided an antenna switch circuit, comprising an input terminal and an output terminal, a field effect transistor connected at a first one of a source electrode and a drain electrode thereof to the input terminal and connected at a second one of the source electrode and the drain electrode to the output terminal, a first controlling power supply to which the drain electrode and the source electrode of the field effect transistor are connected through first and second biasing elements, respectively, a second controlling power supply to which a gate electrode of the field effect transistor is connected through a third biasing element, and a phase shifting element and a feedback resistor connected in series between the second electrode and the gate electrode of the field effect transistor, the field effect transistor being controlled between on and off by varying a voltage of at least one of the first and second controlling power supplies.

With the antenna switch circuit, production of a cross modulation distortion can be suppressed or reduced remarkably by means of the phase shifting element and the feedback resistor. Besides, in order to achieve such suppression or reduction, high voltages are not required for a battery unit from which the first and second controlling power supplies and other necessary power supplies for the antenna switch circuit may be extracted. Further, the antenna switch circuit is simple in construction and requires only a little rise of the cost.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a table illustrating several expressions illustrating a principle of the present invention.

DESCRIPTION OF THE PREFERRED EMBODIMENT

The present invention has been made based on the following principle. In particular, if the angle ø in the expression (3) of FIG. 6 mentioned hereinabove can be set to ø=90, then the expression (3) can be rewritten as given by an expression (4) of FIG. 6, and it can be recognized from the expression (4) that the influence of the amplitude modulation component ωm of the disturbing wave signal is eliminated. Then, since ø=θ2−θ1, the phases θ1 and θ2 should be set suitably. However, they rely upon a parameter of an element such as an FET. Accordingly, if a feedback circuit is provided externally to achieve ø=0, then production of a cross modulation component can be prevented, and as a result, deterioration of the reception sensitivity can be prevented.

The present invent ion is described in more detail below in connection with a preferred embodiment of the present invention.

Figure 1:
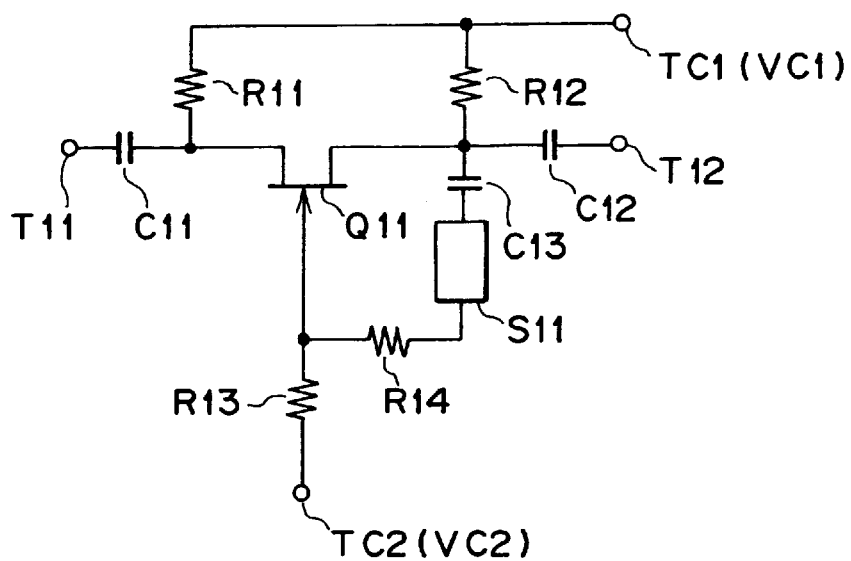
FIG. 1 is a circuit diagram of an antenna switch circuit to which the present invention is applied.

FIG. 1 shows an antenna switch circuit to which the present invention is applied. Referring to FIG. 1, an input terminal T11 to which a reception signal is supplied from an antenna not shown is connected through a DC cutting capacitor C11 to the source of a switching FET (Q11), for example, of the junction type which includes a gallium-arsenic semiconductor substrate. The drain of the FET (Q11) is connected to an output terminal T12 through a DC cutting capacitor C12. Further, the source and the drain of the FET (Q11) are connected to a first controlling terminal TC1 through biasing resistors R11 and R12, respectively.

Further, the gate of the FET (Q11) is connected to a second controlling terminal TC2 through a biasing resistor R13, and a phase shifting element S11 and a feedback resistor R14 are connected in series between the drain and the gate of the FET (Q11) with a DC cutting capacitor C13 interposed between the drain and the gate of the FET (Q11).

In this instance, the phase shifting element S11 can be implemented from a micro-strip line, a coil, a capacitor or a phase shifting circuit including any of such elements. Further, controlling voltages VC1 and VC2 are supplied to the controlling terminals TC1 and TC2, respectively.

Figure 4:
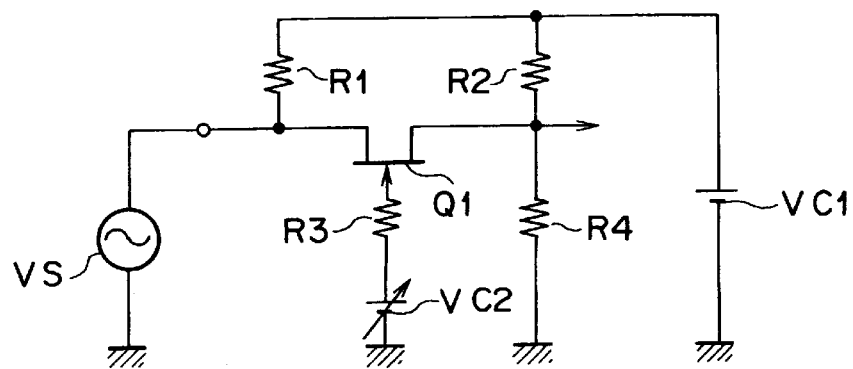
FIG. 4 is a circuit diagram showing a conventional antenna switch circuit.
Figure 5:
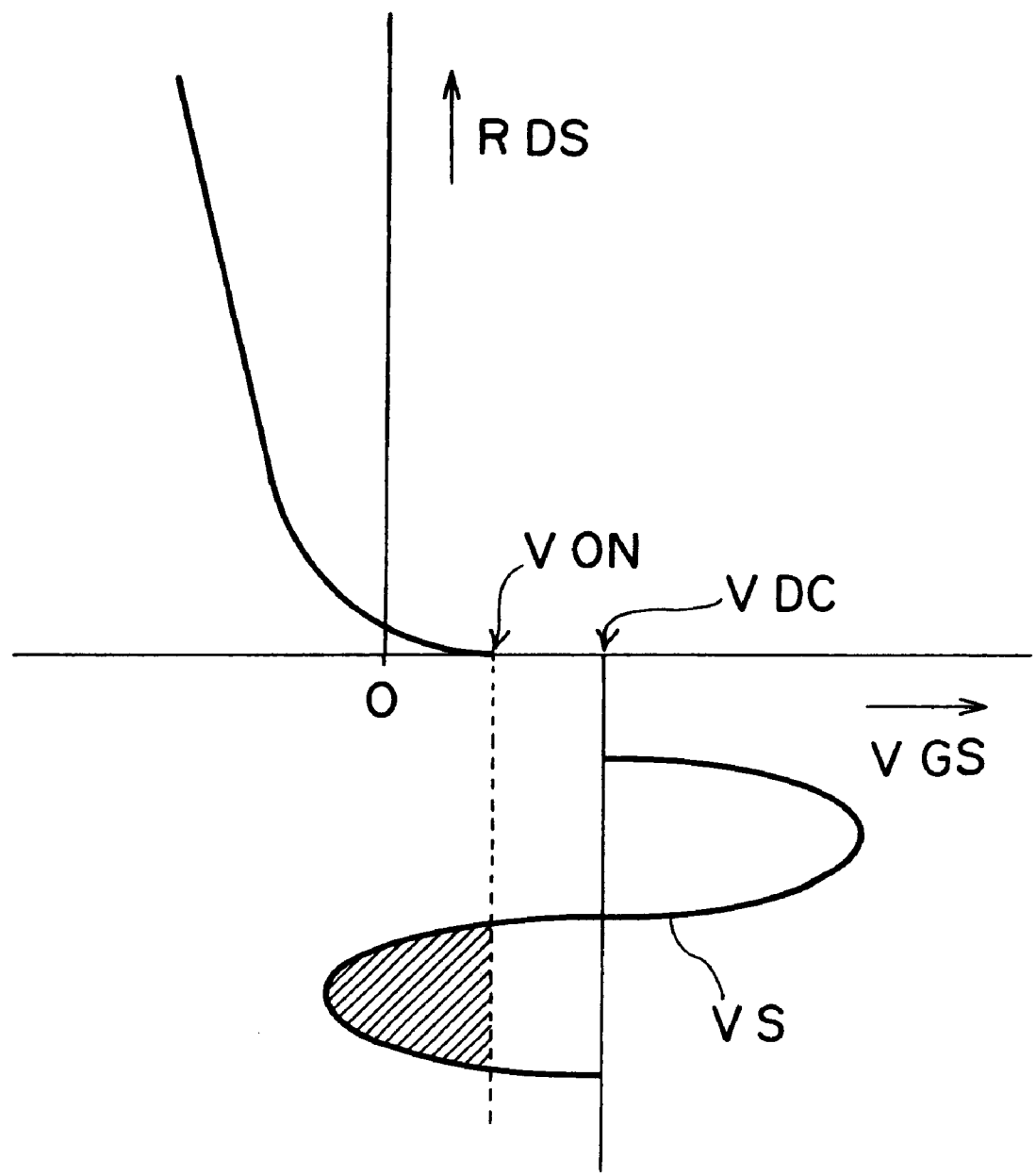
FIG. 5 is a diagram illustrating a characteristic of an FET which is made use of by the present invention.

In the antenna switch circuit having such a construction as described above, the drain-source resistance RDS of the FET (Q11) still depends upon the gate-source voltage VGS and has, for example, such a characteristic as illustrating in FIG. 5. Accordingly, similarly as in the case of the circuit of FIG. 4, by varying both or one of the controlling voltages VC1 and VC2, for example, by varying the controlling voltage VC2, the FET (Q11) can be controlled between on and off, and when the FET (Q11) is on, an input signal to the input terminal T11 is outputted to the output terminal T12 through the FET (Q11).

Figure 2:
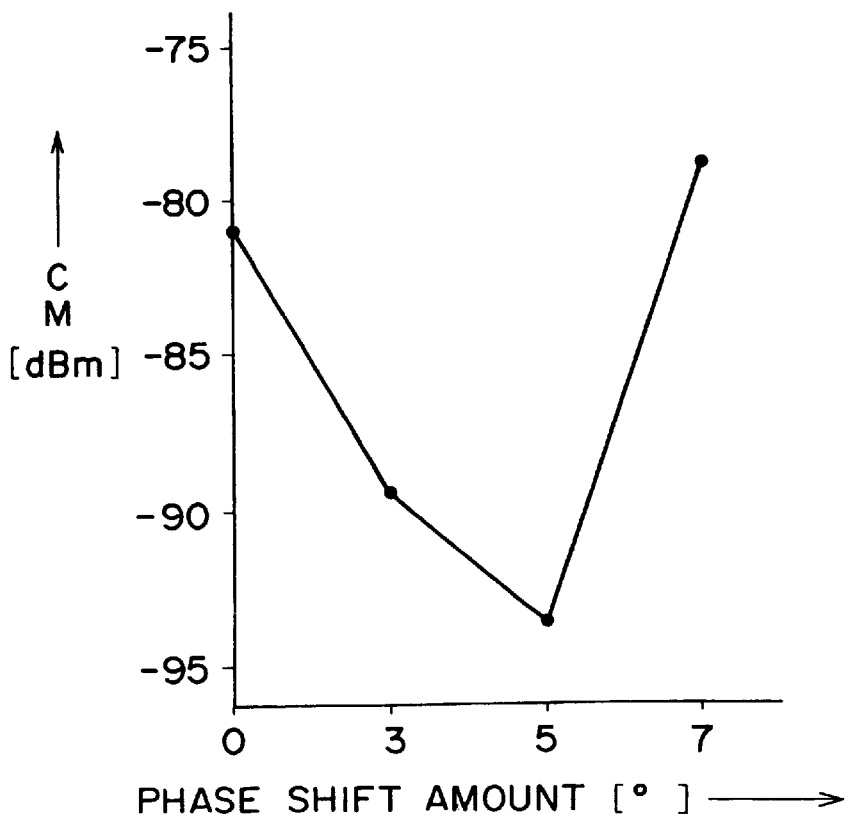
FIG. 2 is a diagram illustrating a characteristic of the antenna switch circuit of FIG. 1.
Figure 3:
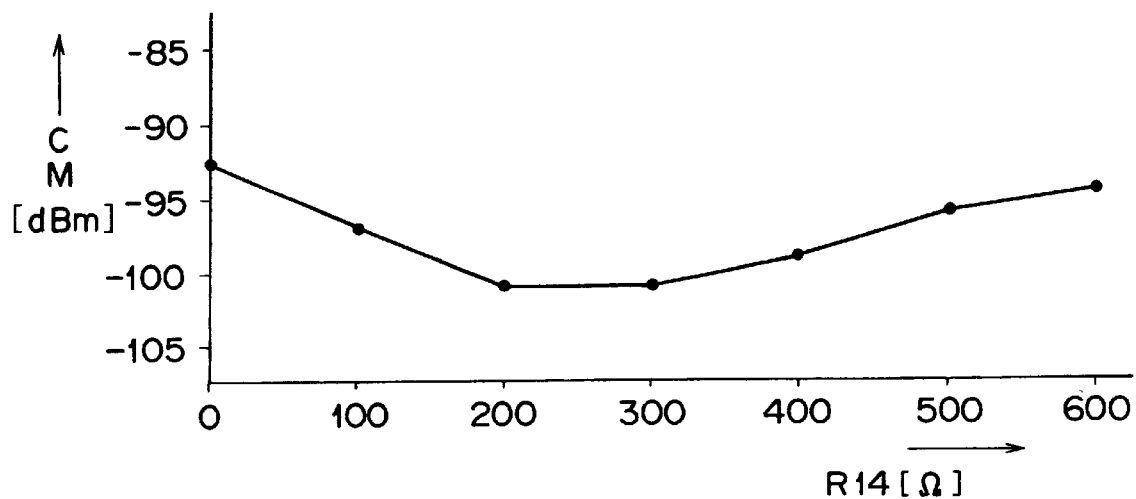
FIG. 3 is a diagram illustrating another characteristic of the antenna switch circuit of FIG. 1.

In this instance, it is supposed that a cross modulation distortion of the signal is caused by the non-linearity of the characteristic, as shown in FIG. 5. However, with the circuit of FIG. 1, since the phase shifting element S11 and the feedback resistor R14 are connected, the cross modulation distortion is suppressed. FIGS. 2 and 3 illustrate results of simulations of cross modulation wherein the phase shifting element S11 and the feedback resistor R14 were connected, respectively. It is to be noted that VC1=3 V and VC2=3 V.

Particularly, FIG. 2 illustrates a relationship between the phase shift amount of the phase shifting element S11 and the magnitude of the cross modulation distortion CM where R14=100Ω. Meanwhile, FIG. 3 illustrates a relationship between the magnitude of the feedback resistor R14 and the magnitude of the cross modulation distortion CM where the phase shift amount of the phase shifting element S11 was 5°. It is to be noted that the magnitude of the cross modulation distortion where the phase shifting element S11 and the feedback register R14 were not connected was −34.8 dBm.

Then, according to the simulation results, when the phase shift amount is 5° and the resistor R14 ranges from 200 to 300Ω, the magnitude of the cross modulation distortion is −100 dBm. Thus, it can be recognized that, when compared with the alternative construction which involves no phase shifting and no feedback, the cross modulation distortion is improved by up to 65.2 dBm.

In this manner, with the circuit of FIG. 1, the cross modulation distortion can be reduced significantly. Besides, there is no need of raising the voltage of the power supply. Further, since it is only required to connect the phase shifting element S11 and the feedback resistor R14, the circuit is simple in construction and requires little rise in cost.

Figure 7:
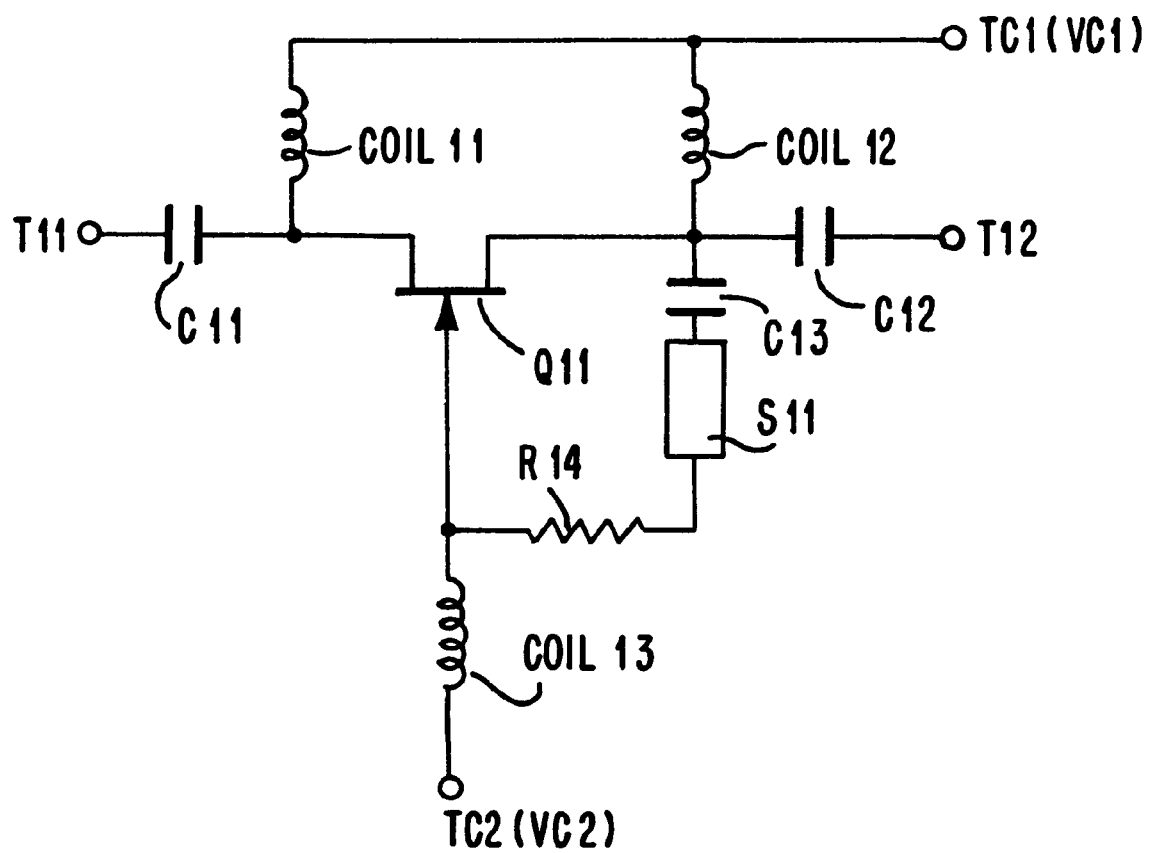
FIG. 7 is a circuit diagram of an antenna switching circuit according to another embodiment of the present invention.

As shown in FIG. 7, it is to be noted that the biasing resistors R11 to R13 described above may each be replaced by a coil which exhibits a sufficiently high impedance in a signal frequency.

While a preferred embodiment of the present invention has been described using specific terms, such description is for illustrative purposes only, and it is to be understood that changes and variations may be made without departing from the spirit or scope of the following claims.

What is claimed is:

1. An antenna switch circuit comprising:

an input terminal and an output terminal;

a field effect transistor connected at a first one of a source electrode and a drain electrode thereof to said input terminal and connected at a second one of said source electrode and said drain electrode to said output terminal;

first, second, and third biasing elements;

a first controlling power supply to which said drain electrode and said source electrode of said field effect transistor are connected through said first and second biasing elements, respectively;

a second controlling power supply to which a gate electrode of said field effect transistor is connected through said third biasing element; and a phase shifting element and a feedback resistor connected in series between said second one of said source electrode and said drain electrode and said gate electrode of said field effect transistor, wherein said field effect transistor is controlled between on and off by varying a voltage of at least one of said first and second controlling power supplies, wherein each of said first, second, and third biasing elements is a coil.

2. An antenna switch circuit comprising:

an input terminal and an output terminal;

a field effect transistor connected at a first one of a source electrode and a drain electrode thereof to said input terminal and connected at a second one of said source electrode and said drain electrode to said output terminal;

first, second, and third biasing elements;

a first controlling power supply to which said drain electrode and said source electrode of said field effect transistor are connected through said first and second biasing elements, respectively;

a second controlling power supply to which a gate electrode of said field effect transistor is connected through said third biasing element; and a phase shifting element and a feedback resistor connected in series between said second one of said source electrode and said drain electrode and said gate electrode of said field effect transistor, wherein said field effect transistor is controlled between on and off by varying a voltage of at least one of said first and second controlling power supplies, wherein said phase shifting element is a micro-strip line.

3. An antenna switch circuit comprising:

an input terminal and an output terminal;

a field effect transistor connected at a first one of a source electrode and a drain electrode thereof to said input terminal and connected at a second one of said source electrode and said drain electrode to said output terminal;

first, second, and third biasing elements;

a first controlling power supply to which said drain electrode and said source electrode of said field effect transistor are connected through said first and second biasing elements, respectively;

a second controlling power supply to which a gate electrode of said field effect transistor is connected through said third biasing element; and a phase shifting element and a feedback resistor connected in series between said second one of said source electrode and said drain electrode and said gate electrode of said field effect transistor, wherein said field effect transistor is controlled between on and off by varying a voltage of at least one of said first and second controlling power supplies, wherein said phase shifting element is a coil.

4. An antenna switch circuit comprising:

an input terminal and an output terminal;

a field effect transistor connected at a first one of a source electrode and a drain electrode thereof to said input terminal and connected at a second one of said source electrode and said drain electrode to said output terminal;

first, second, and third biasing elements;

a first controlling power supply to which said drain electrode and said source electrode of said field effect transistor are connected through said first and second biasing elements, respectively;

a second controlling power supply to which a gate electrode of said field effect transistor is connected through said third biasing element; and a phase shifting element and a feedback resistor connected in series between said second one of said source electrode and said drain electrode and said gate electrode of said field effect transistor, wherein said field effect transistor is controlled between on and off by varying a voltage of at least one of said first and second controlling power supplies, wherein said phase shifting element is a phase shifting circuit including a coil and a capacitor.

* * * * *